United States Patent [19]

Charlier et al.

[11] Patent Number: 4,800,556

[45] Date of Patent: Jan. 24, 1989

[54] OPTICAL DATA TRANSMISSION WITH FREQUENCY MULTIPLEXING

[75] Inventors: Jean Charlier, Pontoise; Bernard Geenen, Mareil sur Mauldre; Bernard Laurent; Jean Lorsignol, both of Toulouse; André Malherbe, Pontoise; Jean-Luc Perbos, Toulouse, all of France

[73] Assignee: Matra, Paris, France

[21] Appl. No.: 46,350

[22] Filed: May 6, 1987

[30] Foreign Application Priority Data

May 6, 1986 [FR] France .............................. 86 06506

[51] Int. Cl.⁴ .............................................. H04B 9/00
[52] U.S. Cl. .......................................... 370/3; 370/2; 455/618; 350/401
[58] Field of Search .................... 370/1, 2, 3; 455/618, 455/616, 617; 350/401, 96.19

[56] References Cited

U.S. PATENT DOCUMENTS 3,501,640  3/1970  Harris .................................. 250/199

FOREIGN PATENT DOCUMENTS 0048814  3/1986  Japan .................................. 350/401

OTHER PUBLICATIONS

Spear-Zino et al.; "Multiwavelength Monolithic Integrated Fiber Optics Terminals An Update;" S.P.I.E. Guided-Wave Optical and Surface Wave Devices, Systems and Applications; (1980); vol. 239; (1980); pp. 293-298.

Begley et al., Proceedings of SPIE, vol. 616, 21-22; Jan., 1986, Los Angeles, pp. 276-280.

Primary Examiner—Robert L. Griffin
Assistant Examiner—Andrew J. Telesz, Jr.
Attorney, Agent, or Firm—Fleit, Jacobson, Cohn & Price

[57] ABSTRACT

A transmitter for multiplexing three optical channels at different wavelengths has (a) first, second and third laser diode means delivering linearly polarized optical beams at respective wavelengths $\lambda 2$, $\lambda 3$ and $\lambda 4$ which are mutually different; (b) an assembly located in the path of the light of wavelength $\lambda 2$ emitted by said first diode means and including a plate which is substantially quarter-wave for the wavelength ($2 \lambda 2 - \lambda 4$), a filter having a band pass centered on wavelength $\lambda 2$, a plate quarter-wave which is substantially for wavelength $\lambda 4$ and a polarizer, the first diode means being oriented so that its beam is transmitted by the polarizer. A first light beam combiner directs light from said third diode means onto the polarizer along a direction of 90° from the direction of the beam of wavelength $\lambda 2$ and with the same polarization direction, so that the beam of wavelength $\lambda 4$ is reflected towards said filter. A second combiner directs the light from said second diode, having wavelength $\lambda 3$ intermediate between $\lambda 2$ and $\lambda 4$, onto the polarizer in a direction opposite to that of the light beam of wavelength $\lambda 4$ and with a polarization of the same direction, so that the light of wavelength $\lambda 3$ is reflected along a path coaxial with the output path of the light having wavelength $\lambda 2$ and $\lambda 4$. More than three channels may be combined.

7 Claims, 2 Drawing Sheets

OPTICAL DATA TRANSMISSION WITH FREQUENCY MULTIPLEXING

BACKGROUND OF THE INVENTION

1. Technical Field

The invention relates to optical data transmission and it is particularly suitable for use in data links between satellites (particularly between a satellite placed in a low orbit and a geostationary satellite).

2. Prior Art

Optical data transfer using frequency multiplexing has been known for long. An example may be found in U.S. Pat. No. 3,501,640 (Harris).

In optical links between satellites it has already been proposed to use laser diodes as light sources. Laser diodes are small size and reliable, have a high field and a considerable life duration. Among laser diodes, gallium arsenide diodes are of particular interest: monomode diodes capable of supplying a power up to about 50 mW continuously are available in the wavelength range between 810 and 850 nm, and efficient sensors are available in the wavelength range between 400 and 1100 nm.

The unavailability of laser diodes having a power higher than 50 mW and the need for transmitting high digital flow rates (typically 500 Mbits/s) or the advantage of transmitting over several independent channels make it however necessary to use several laser diodes simultaneously for transmission on a same beam. Different power summation and multiplexing techniques have already been proposed. They are summed up in an article by Begley et al, "Selection of laser diode beam combining techniques for free space communication" Proceedings of SPIE, Volume 616, 21–22 January 1986, Los Angeles, pp. 276–280. The proposed approaches have serious drawbacks. In particular, most of them use dichroic mirrors which receive light beams under an oblique incidence for multiplexing or demultiplexing (the second operation being more difficult to achieve, for it must provide sufficient separation between adjacent channels). The dichroic mirrors fail to reach that result perfectly and require that there is an appreciable wavelength difference between adajacent channels.

It has also been proposed to use the very high polarization of light emitted by laser diodes and to use summation of the beams coming from several diodes along a single output path rather than frequency multiplexing. This solution however has not proven satisfactory, probably because the known arrangements make use of components which receive light under oblique incidence for bringing all beams along the same output axis.

SUMMARY OF THE INVENTION

It is an object of the invention to provide data transmission using frequency multiplexing which avails of the high degree of polarization of laser diodes for facilitating frequency multiplexing and increasing the number of channels available in a predetermined wavelength range.

The invention provides an optical data transmission method wherein the light beams of at least three laser diodes are superimposed along the same output path, the set emission wavelengths of the diodes having separation which may be less than the bandwith of the channels; the light from a diode has a polarization plane crossed with the polarization plane of the light coming from diodes having adjacent wavelengths, in the output beam.

There is further provided an optical transmission device with multiplexing of three channels (or more) of different wavelengths, having a transmitter including:

three laser diodes (or more) delivering linearly polarized optical beams at three different wavelengths $\lambda 2$, $\lambda 3$ and $\lambda 4$, in the path of the light of wavelength $\lambda 2$ emitted by one of the diodes, an assembly including a quarter-wave plate for the wavelength $(2\lambda 2 - \lambda 4)$, a filter for transmitting the wavelength $\lambda 2$, a quarterwave plate for the wavelength $\lambda 4$ and a polarizer, the diode of wavelength $\lambda 2$ being oriented so that its beam is transmitted by the polarizer.

means for directing the light of wavelength $\lambda 4$ coming from another diode onto the polarizer at 90° from the beam of wavelength $\lambda 2$ and with the same polarization direction, so that the beam of wavelength $\lambda 4$ is reflected towards the filter, means for directing the light of wavelength $\lambda 3$, intermediate between $\lambda 2$ and $\lambda 4$, onto the polarizer opposite the light of wavelength $\lambda 4$ and with a polarization of the same direction, so that the light of wavelength $\lambda 3$ is reflected along a path coaxial with the output path f the wavelength $\lambda 2$ and $\lambda 4$.

The last-mentioned means may be arranged for multiplexing the wavelength $\lambda 3$ and an additional wavelength $\lambda 1$ which is outside the range of from $\lambda 2$ to $\lambda 4$. The last means may have the same construction as the above-mentioned assembly, but receive two light beams of wavelengths $\lambda 1$ and $\lambda 3$ having a polarization plane perpendicular to that of the light beams of wavelengths $\lambda 2$ and $\lambda 4$.

The number of wavelengths may be further increased up to a maximum allowed by the frequency band in which the sources and light detectors may work.

There is also provided a complete transmission device including a receiver whose construction is to a large extent symmetrical with that of the transmitter. Since the angular position of the receiver with respect to the transmitter may change, it will generally be necessary to locate, in the path of the output beam, a plate which quarter-wave for the average frequency of the transmission range so as to obtain a circularly polarized beam. The optical reflection surfaces will usually be treated so as to preserve the polarizations as as much as possible.

It is important to note that the device uses filters which receive light under an orthogonal incidence and quarter-wave plates which can be exactly adapted to the respective beams, except the plate giving a polarization to the output beam. Thus losses are reduced and distorsions and polarization losses are avoided much more than in prior systems.

The invention will be better understood from reading the following description of a particular emboidment and a variant, given by way of non limitative examples.

SHORT DESCRIPTION OF THE DRAWINGS

Figure 1:
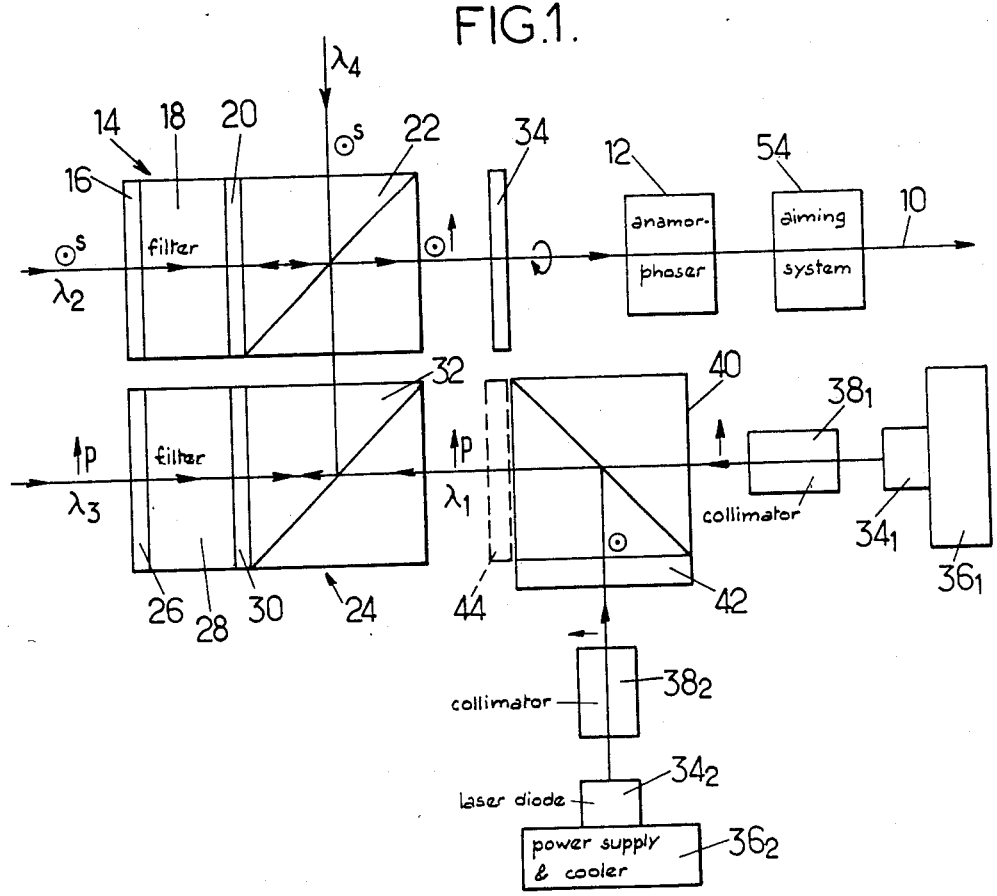
FIG. 1 is a diagram showing a possible construction of the transmitter of a transmission system with multiplexing of four frequencies.
Figure 3:
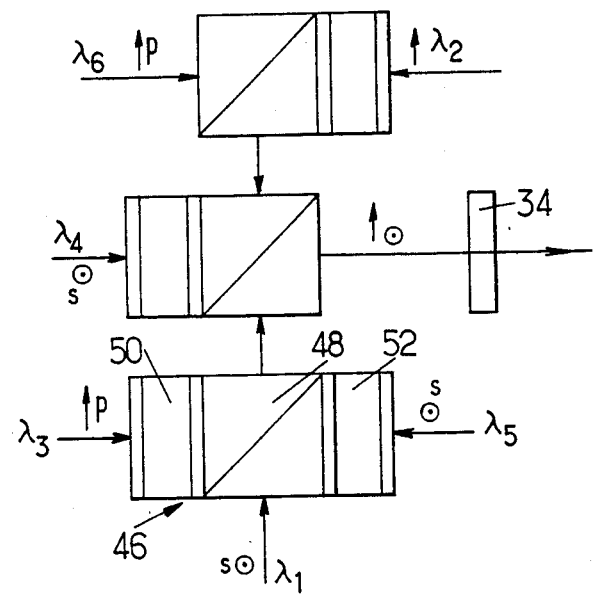
Figure 4:
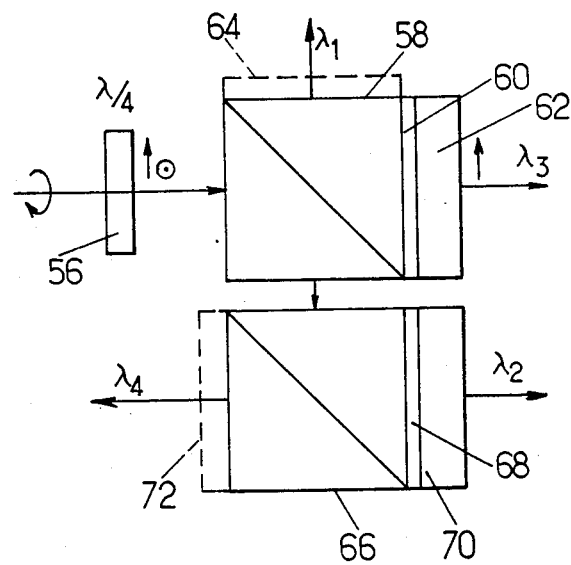

FIG. 3, similar to FIG. 1, shows a transmitter which achieves multiplexing of six frequencies; and FIG. 4 is a diagram of a receiver usable in connection with the transmitter of FIG. 1 in a transmission system.

DETAILED DESCRIPTION OF A PREFERRED EMBODIMENT

Figure 2:
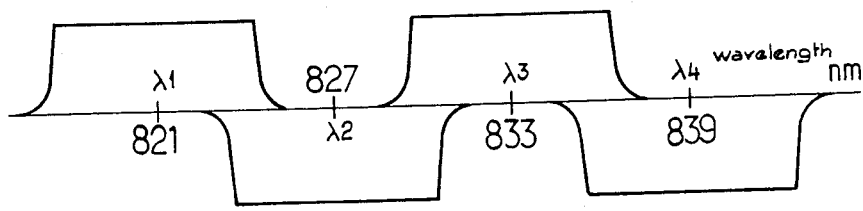
FIG. 2 shows a possible distribution of the frequencies in the transmitter of FIG. 1.

The transmitter shown in FIG. 1 is arranged for multiplexing four channels at respective frequencies λ1, λ2, λ3 and λ4 and delivering them as a common orientatable output beam 10. Each of the four channels includes a source of polarized light which will be assumed to be a GaAs laser diode and the wavelengths will be assumed to be λ1=821 nm, λ2=827 nm, λ3=833 nm and λ4=839 nm (FIG. 2). The spacing between two adjacent wavelengths is only 6 nm. Due to the crossed polarization in two adjacent channels, it is possible to accept a bandwidth for each diode greater than 6 nm, with two consequences: it is unnecessary to use a narrow band filter which would increase the losses; and the laser diodes need not have an emission accurately centered on the above-defined values of λ; their manufacture is consequently rendered easier and the influence of wavelength variation due to aging and to the imperfection of the system which regulates the temperature of diodes is reduced.

The light emitted by a laser diode is naturally polarized in the plane of the diode junction and the beam delivered by such a diode is appreciably elliptic. Since it is desirable to obtain at the output an amount of ellipticity which is the same for all the channels so that it is possible to form a cylindrical beam using an anamorphoser 12, it will frequently be advisable to locate all laser diodes in the same angular position and to insert a λ/2 plate in those channels which must have a polarization crossed with the others.

Referring to FIG. 1, the multiplexer of the transmitter includes an assembly 14 which comprises, along the path of the light having wavelength λ2 and a first polarization direction s, a first transparent plate 16 which will be more completely defined later, an optical filter 18 with a central frequency corresponding to wavelength λ2, a second plate 20 and finally a polarizer cube 22. The laser diode which emits light at wavelength λ4 is so located that its polarization plane is also along s and it delivers a beam which enters the polarizer block 20 orthogonally to the first beam.

Plate 20 is constructed to be a quarter-wave plate for wavelength λ4. Plate 16 is constructed to be quarter wave for (2λ2−λ4). Therefore, The light having wavelength λ4, having polarization direction s, is reflected by the polarizer block 22 towards plate 20. It passes through plate 20 which gives it a circular polarization, then is reflected by filter 18 (since filter 18 is centered on wavelength λ2). The light passes back through plate 20 which gives it a rectilinear polarization, this time with direction p (orthogonal to s) which allows it to pass through polarizer 22 and to leave the assembly with polarization direction p.

The light having wavelength λ2 and linearly polarized along s is polarized practically circularly by plate 16 which is almost a quarter-wave plate for λ2 (since λ2−λ4 is small as compared to λ2). The light then passes through filter 18 centered on λ2. Its linear polarization is changed to direction p when passing through plate 20 (the set of plates 16 and 20 having an effect identical to that of a single λ2/2 plate). The light is then transmitted by polarizer 22 and leaves the multiplexer in the same beam as the light of wavelength λ4, with polarization p.

For multiplexing the third channel, it is sufficient to send the light having wavelength λ3 onto the polarizer block 22 in a direction opposite to that of the light of wavelength λ4.

As shown in FIG. 1, the multiplexer includes a second assembly 24 for multiplexing the wavelengths λ1 and λ3.

Assembly 24 includes, along the path of the light of wavelength λ3, a plate 26 of thickness (2λ3−λ1)/4, a filter 28 centered on λ3, a plate 30 which is quarter-wave for λ1 and a polarizer cube 32.

The light of wavelength λ1, linearly polarized in direction p, passes through polarizer 32 and through plate 30 which polarizes it circularly, is reflected by filter 28 centered on λ3, assumes again a linear polarization (this time having direction s) on its second passage through plate 30 and is then reflected by the polarizer 32 towards the polarizer 22. It leaves the mutliplexer with polarization s.

Last, the light of wavelength λ3 enters assembly 24 with a linear polarization in direction p. Plate 26 gives it practically circular polarization. The light is passed by filter 28 centered on λ3. The plate 30 gives it a rectilinear polarization of direction s. Finally, the light is reflected by the two polarizers 32 and 22 successively and leaves the multiplexer with polarization s.

As shown in FIG. 1, a plate 34, which may be a quarter-wave plate for wavelength (λ1+λ4)/2 (that is to say for the mid value in the range from λ1 to λ4), is located on the beam path at the output of the multiplexer. It delivers a beam with circular polarization.

All components may be conventional in nature. The polarizers 22 and 32 typically consist of stacks of thin layers on glass prisms with transmission and reflection coefficients for respective wavelengths which may be as high as 98%. Quarter-wave plates are readily available commercially. Filters 18 and 28 may be manufactured in thin layer technology. Since they receive light under normal incidence, they have a well-defined passband.

A suitable collimator may be provided on the light output of each laser diode for delivering an output beam which is hardly divergent. Then, all optical elements operate under good conditions. The operating parameters, and particularly the optical index of the glasses, may be maintained constant by thermal regulation.

Reliability requirements may require redundancy of each of the light sources. In FIG. 1, only the source which supplies light at wavelength λ1 has been shown. It includes two laser diodes $34_1$ and $34_2$ with their power circuits and Peltier coolers $36_1$ and $36_2$ for thermal regulation. A collimator $38_1$ and $38_2$ is placed at the output of each diode. The beam from laser diode $34_1$ passes in straight line through a polarizer 40 to polarizer 32. In the path of the output beam from diode $34_2$, which reaches the analyzer at 90° from the output beam of diode 34, is interposed a plate 42 which is half-wave for wavelength λ1. When diode $34_2$ is used rather than diode $34_1$, a compensation plate 44, half wave for λ1, is placed at the output of polarizer 40.

A number of beams of different wavelengths greater than 4 can be multiplexed. FIG. 3 shows, by way of example, a transmission multiplexer delivering an output beam combining six mutually offset wavelengths λ1, λ2, . . . λ6. The polarization of the components having wavelengths, λ1, λ3 and λ5 in the output beam is in direction s, whereas the polarization of components λ2, λ4, λ6 is in direction p orthogonal to s. Multiplexing of six wavelengths requires adding an assembly 46 including a polarizer 48, two filters 50 and 52 and four quarter-wave plates to the elements illustrated in FIG. 1.

In the embodiment of FIG. 3, the quarter-wave plates are no longer perfectly matched but that is practically without consequence on the performances for the incomplete polarization is not found in the output beam.

An even greater number of wavelengths can be multiplexed but, in practice however, it is difficult to exceed six input beams when laser diodes are used as sources. It becomes difficult to have filters which are sufficiently selective for reflecting one wavelength substantially totally and transmitting another wavelength substantially totally when the two values are too close to each other.

Rather than a distribution as shown in FIG. 2 (possibly extended to six frequencies) $\lambda 1$ and $\lambda 2$ respectively, $\lambda 3$ and $\lambda 4$, etc. may be equal, with mutually crossed polarization. Thus, the number of frequencies may be further increased. To reach this result, the filters must have a very high transmission coefficient for the wavelength which they have to pass ($\lambda 2$ and $\lambda 3$ in FIG. 1), a very high reflection coefficient and a very low transmission for the adjacent (or equal) wavelengths having a crossed polarization, that is to say $\lambda 1$ with respect to filter 28 and $\lambda 4$ with respect to filter 18.

When mounted on a satellite, the transmitter will be completed by an aiming device and a telescope, shown schematically in FIG. 1 at 54. The telescope may be of the Cassegrain type. The aiming device will typically include a coarse aiming mirror and a fine aiming mirror. Considering the travel distances, it will be necessary to provide either a tracking system, or a computing system taking into account the need to aim to a point in advance of the receiver to sum the time taken by light to travel from the transmitter to the receiver is not negligible.

It is not necessary to define here the servocontrol or computing devices, for they may have one of the known constructions presently used for links between satellites.

The demultiplexer provided in the receiver will generally have a construction symmetrical with that of the multiplexer. FIG. 4 shows, by way of example, a demultiplexer which may belong to a system whose transmitter is as shown in FIG. 1. The demultiplexer is placed after a quarter-wave plate 56. It includes a first polarizer cube 58 which transmits wavelengths $\lambda 1$ and $\lambda 3$ which have polarization p, and reflects the wavelengths $\lambda 2$ and $\lambda 4$ with polarization s. In the path of the beam containing the wavelengths $\lambda 1$ and $\lambda 3$ are inserted successively a plate 60, quarter-wave for $\lambda 1$, and a filter 62 whose pass-band is centered on $\lambda 3$. The wavelength $\lambda 1$ is reflected by the filter and, since its double passage through plate 60 has caused its polarization to turn through 90°, it is reflected by polarizer 58 and leaves the assembly along a path orthogonal to that of component $\lambda 3$. A filter 64, whose pass band is centered on $\lambda 1$, may be inserted at the output of the polarizer in the path of component $\lambda 1$.

A second polarizer cube 66, also associated with a plate 68, quarter-wave for $\lambda 4$, and a filter 70 centered on $\lambda 2$, separates components $\lambda 2$ and $\lambda 4$. A filter 72, centered on $\lambda 4$, may be inserted in the output path of $\lambda 4$.

It is important to note that, in the demultiplexer, the filters 62 and 70 are to reflect a wavelength which is not directly adjacent the wavelength at which they work by transmission, which improves separation and attenuates cross-talk.

It is not necessary to describe here the demultiplexer, associated with the multiplexer of FIG. 3, since it is obvious from the above description of FIG. 4.

We claim:

1. In an optical transmission system with multiplexing of at least three channels at different wavelengths, a transmitter comprising:
   (a) first, second and third laser diode means delivering linearly polarized optical beams at respective wavelengths $\lambda 2$, $\lambda 3$ and $\lambda 4$ which are mutually different,
   (b) an assembly located in the path of the light of wavelength $\lambda 2$ emitted by said first diode means and including a plate which is substantially quarter-wave for a wavelength equal to $(2\lambda 2 - \lambda 4)$, a filter having a band pass centered on wavelength $\lambda 2$, a plate which is substantially quarter-wave for wavelength $\lambda 4$ and a polarizer, the first diode means being oriented so that its beam is transmitted by the polarizer,
   (c) first means for directing the light from said third diode means onto the polarizer along a direction at 90° from the direction of the beam of wavelength $\lambda 2$ and with the same polarization direction, so that the beam of wavelength $\lambda 4$ is reflected towards said filter and back by said filter along an output path common with the output path of the light having wavelength $\lambda 2$, and
   (d) second means for directing the light from said second diode means, having wavelength $\lambda 3$ intermediate between $\lambda 2$ and $\lambda 4$, onto the polarizer in a direction opposite to that of the light beam of wavelength $\lambda 4$ and with a polarization orthogonal to that of the light of wavelength $\lambda 4$, so that the light of wavelength $\lambda 3$ is reflected along a path coaxial with said common output path.

2. A system according to claim 1, wherein the second means multiplexes the wavelength $\lambda 3$ and an additional wavelength $\lambda 1$ outside the range of from $\lambda 2$ to $\lambda 4$.

3. A system according to claim 2, wherein the second means comprises a supplemental assembly having the same construction as the first named assembly, but receives two light beams of wavelengths $\lambda 1$ and $\lambda 3$ having a polarization plane perpendicular to that of the wavelengths $\lambda 2$ and $\lambda 4$.

4. A system according to claim 1, further including a transparent plate inserted in the output beam for circularizing the polarization.

5. A system according to claim 1, further including a receiver having an input demultiplexer symmetrical with the multiplexer.

6. In an optical transmission system with multiplexing of at least four channels at different wavelengths, a transmitter comprising:
   (a) first, second, third and fourth laser diode means delivering linearly polarized optical beams at respective wavelengths $\lambda 2$, $\lambda 3$, $\lambda 4$ and $\lambda 1$ which are mutually different,
   (b) a first assembly located in the path of the light of wavelength $\lambda 2$ emitted by said first laser diode means and including, in succession, a plate which is substantially quarter-wave for a wavelength equal to $(2 \lambda 2 - \lambda 4)$, a filter having a band pass centered on wavelength $\lambda 2$, a plate which is substantially quarter-wave for wavelength $\lambda 4$ and a first polarizer, the first diode means being oriented so that its beam is transmitted by the polarizer, (c) means for directing the light from said third diode means of wavelength $\lambda 4$ onto the polarizer along a direction at 90° form the direction of the beam of wavelength $\lambda 2$ and with the same polarizaton direction, so that the beam of wavelength $\lambda 4$ is reflected towards said filter and back by said filter along an output path common with the output path of the light having wavelength $\lambda 2$, (d) a second assembly for directing the light from said second and fourth diode means, respectively having wavelengths $\lambda 3$ and $\lambda 1$, one of which is intermediate between $\lambda 2$ and $\lambda 4$ and the other of which is outside the wavelength range extending from $\lambda 2$ to $\lambda 4$ onto the polarizer in a direction opposite to that of the light beam of wavelength $\lambda 4$ and with a polarization orthogonal to that of the light beam of wavelength $\lambda 4$, so that the light of wavelength $\lambda 3$ is reflected along a path coaxial with said common output path, wherein said second assembly includes an additional polarizer receiving, in two opposite directions orthogonal to its output, the beams of wavelengths $\lambda 3$ and $\lambda 1$ having the same polarization and said beam of wavelength $\lambda 3$, before reaching the polarizer, passes through a plate which is substantially quarter-wave for $(2\lambda 3 - \lambda 1)$, a filter for said wavelength $\lambda 3$ and a plate which is quarter-wave for wavelength $\lambda 1$.

7. A system according to claim 6, wherein said means for directing the light from said third diode means includes a further assembly multiplexing said wavelength $\lambda 4$ and an additional wavelength outside the range from $\lambda 1$ to $\lambda 4$.

* * * * *